US005900639A

United States Patent [19]

Peters

[11] Patent Number: 5,900,639

[45] Date of Patent: May 4, 1999

[54] APPARATUS FOR DETECTING THE PRESENCE AND SPEED OF A RECORD MEDIUM

[75] Inventor: Kenneth J. Peters, Dundee, United Kingdom

[73] Assignee: NCR Corporation, Dayton, Ohio

[21] Appl. No.: 08/664,949

[22] Filed: Jun. 14, 1996

[30] Foreign Application Priority Data

Dec. 22, 1995 [GB] United Kingdom .................. 9526338

[51] Int. Cl.[6] .................................................. G01N 21/86

[52] U.S. Cl. ................................ 250/559.4; 250/559.47; 377/15

[58] Field of Search ........................... 250/559.4, 559.47, 250/559.32, 223 R, 557; 355/407, 408; 377/8, 15, 18

[56] References Cited

U.S. PATENT DOCUMENTS 5,291,225 3/1994 Saito .................................. 250/559.4

*Primary Examiner*—Que Le

[57] ABSTRACT

The present invention relates to an apparatus for detecting the presence of a record medium (31) in a feed path (22) and for sensing the speed of the record medium (31) as it passes along the feed path (22). The invention includes roller means (28) movable between a first position when the record medium (31) is not present in the feed path (22) and a second position when the record medium (31) is passing along the feed path (22). The roller means (28) are arranged to be rotated by virtue of engagement with the record medium (31) when in the second position. Sensing means (24) operative to provide an indication of the absence of the record medium (31) when the roller means (28) is in the first position are also provided along with pulse generating means (40,45) arranged to generate a series of pulses in response to rotation of the roller means (28). The invention further includes an electronic control means (48) responsive to the pulses generated by the pulse generating means (40,45) and arranged to make a determination of the speed of the record medium (31) as it passes along the feed path (22).

18 Claims, 3 Drawing Sheets

APPARATUS FOR DETECTING THE PRESENCE AND SPEED OF A RECORD MEDIUM

BACKGROUND OF THE INVENTION

The present invention relates to an apparatus for detecting the presence of a record medium, and more particularly relates to such an apparatus in which both the presence of the record medium is detected and the speed of motion of the record medium is measured during the passage of the record medium along a feed path (which may be formed by drive belts or rollers).

The apparatus which is the subject of the present invention may be employed in a variety of applications in which it is desired to detect the presence and speed of motion of record media as said media traverse a feed path. One such application is in a printer module which is employed in automated teller machines (ATMs) widely used by financial institutions such as banks. The printer module is capable of printing an account balance or a receipt of an ATM transaction, for a customer who uses the ATM.

The printer module prints, say a transaction receipt, on a continuous roll of paper and cuts the paper to size after the receipt is printed. The receipt is then transported to a receipt slot in the front fascia of the ATM for collection by the user of the ATM.

The continuous roll of receipt paper is mounted on a spindle the ends of which are each received in a recess in the printer. During operation the leading portion of the roll of paper is received by feed means which transport this portion of the paper, extending from the paper roll, through a dot matrix printer which prints text on the paper a dot line at a time, the paper being advanced a predetermined distance between each dot line. Several consecutive dot lines are required to print an alpha numeric character using this method of printing.

One problem with this mechanism is that friction on the aforementioned spindle or partial jamming of the paper can cause the paper to be transported through the printer more slowly than anticipated, resulting in compressed print which in some cases will be illegible. This is a particularly serious problem when the document being printed has legal significance, such as a transaction receipt.

SUMMARY OF THE INVENTION

It is accordingly an object of the present invention to provide a reliable and inexpensive apparatus for detecting the presence and measuring the speed of motion of a record medium passing along a feed path.

According to the present invention there is provided an apparatus for detecting the presence of a record medium in a feed path and for sensing the speed of said record medium as it passes along said feed path, including roller means moveable between a first position when said record medium is not present in said feed path and a second position when said record medium is passing along said feed path, said roller means being arranged to be rotated by virtue of management with said record medium when in said second position, sensing means operative to provide an indication of the absence of said record medium when said roller means is in said first position, pulse generating means arranged to generate a series of pulses in response to rotation of said roller means and electronic control means responsive to pulses generated by said pulse generating means if the speed of said record medium as it passes along said feed path.

BRIEF DESCRIPTION OF THE DRAWINGS

An embodiment of the present invention will now be described, by way of example, with reference to the accompanying drawings, in which:

FIGS. 1 and 2 include a partial showing of frame members 10 and 12 of a media transportation mechanism indicated generally by the reference numeral 14, and forming part of a printer.

DETAILED DESCRIPTION

Figure 1A:
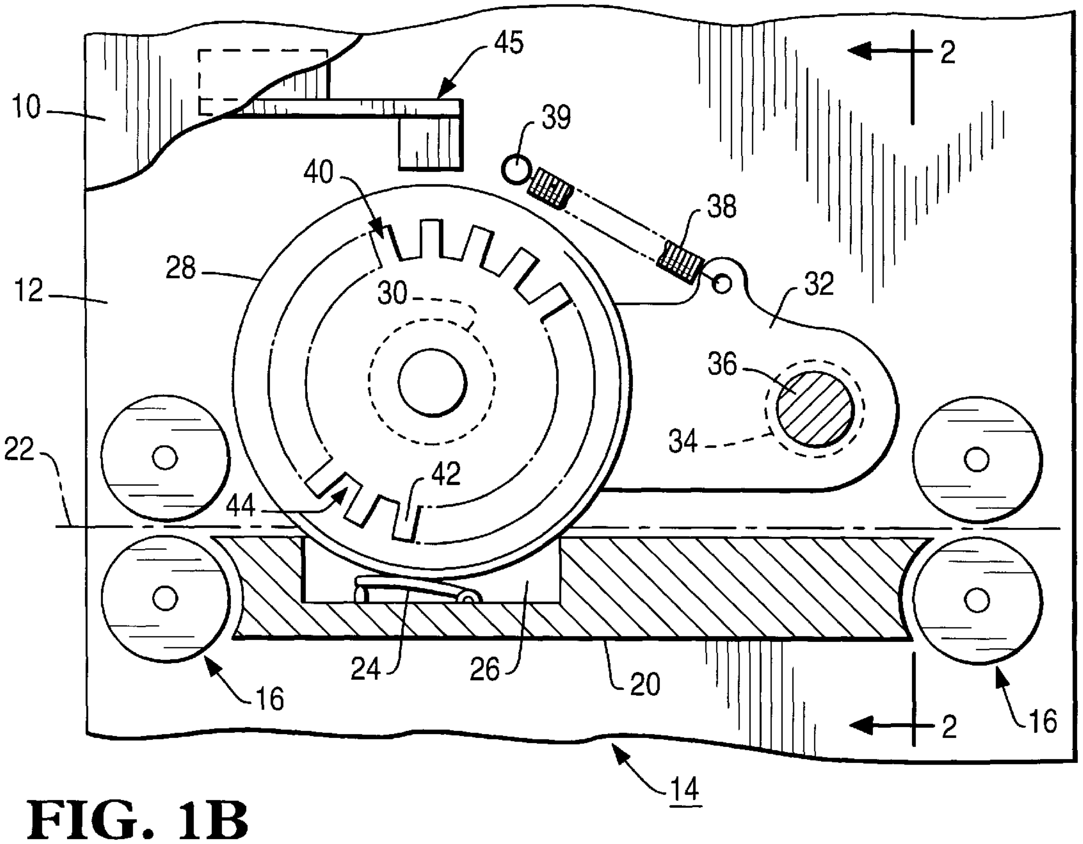
FIG. 1A is a side elevational view of a record media transportation mechanism including an apparatus in accordance with the present invention, in which no record medium is present.

The aforementioned media transportation mechanism 14 includes feed rollers 16 and guide means 20 located adjacent the feed rollers 16, and a second guide means 20 to form a feed path 22 through the media transportation mechanism 14. A media presence detector in the form of a microswitch 24 is located in a recess 26 in the second guide means 20.

Figure 1B:
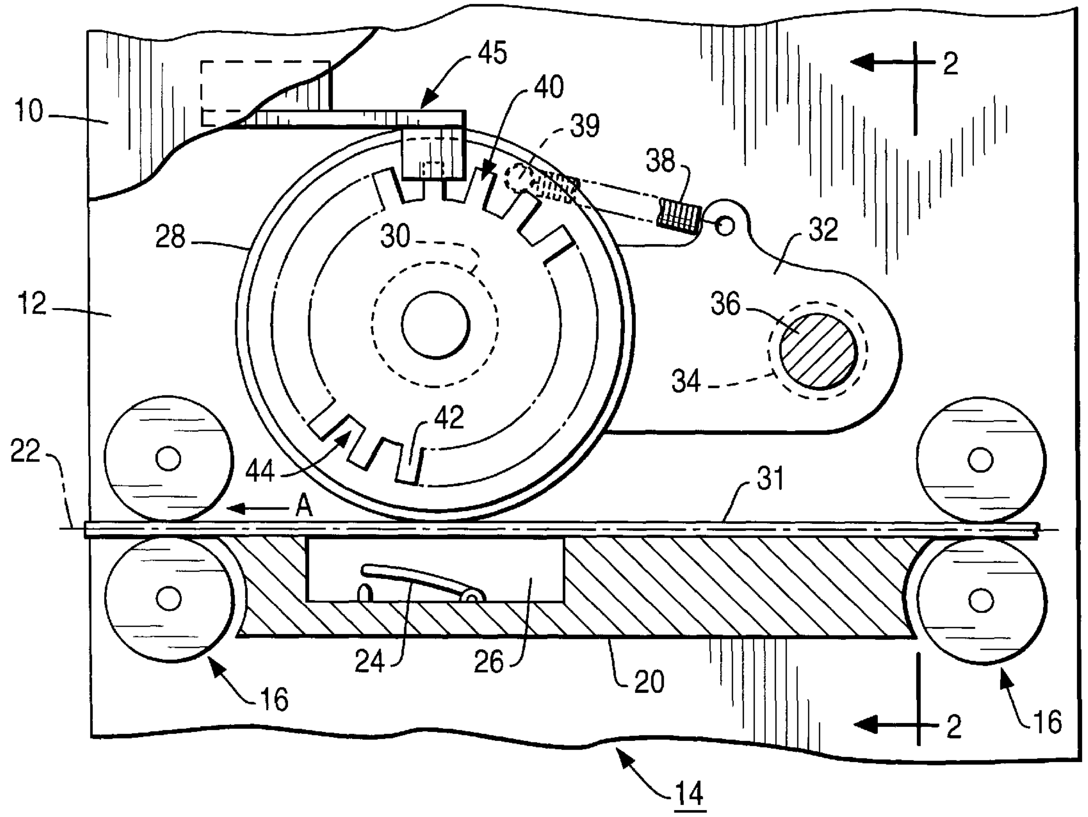
FIG. 1B is a side elevational view, similar to FIG. 1A, in which a record medium is passing along a feed path.
Figure 2A:
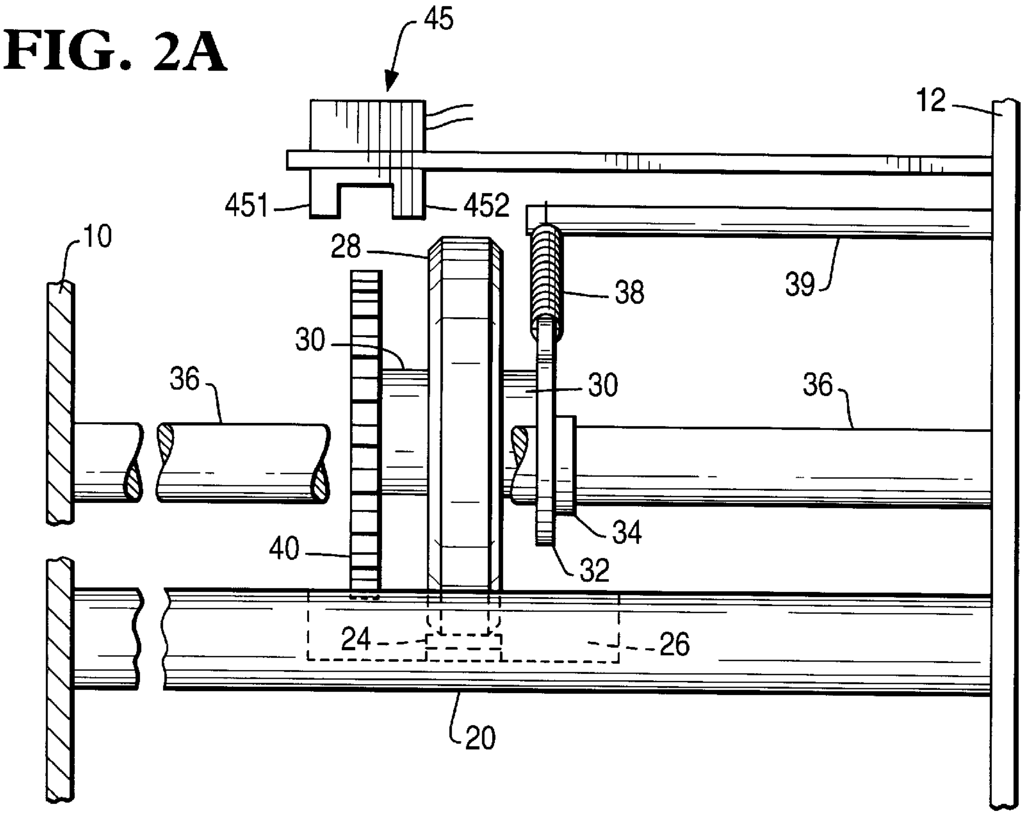
FIG. 2A is an end elevational view of the mechanism of FIG. 1A taken along the line 2—2 of FIG. 1A.
Figure 2B:
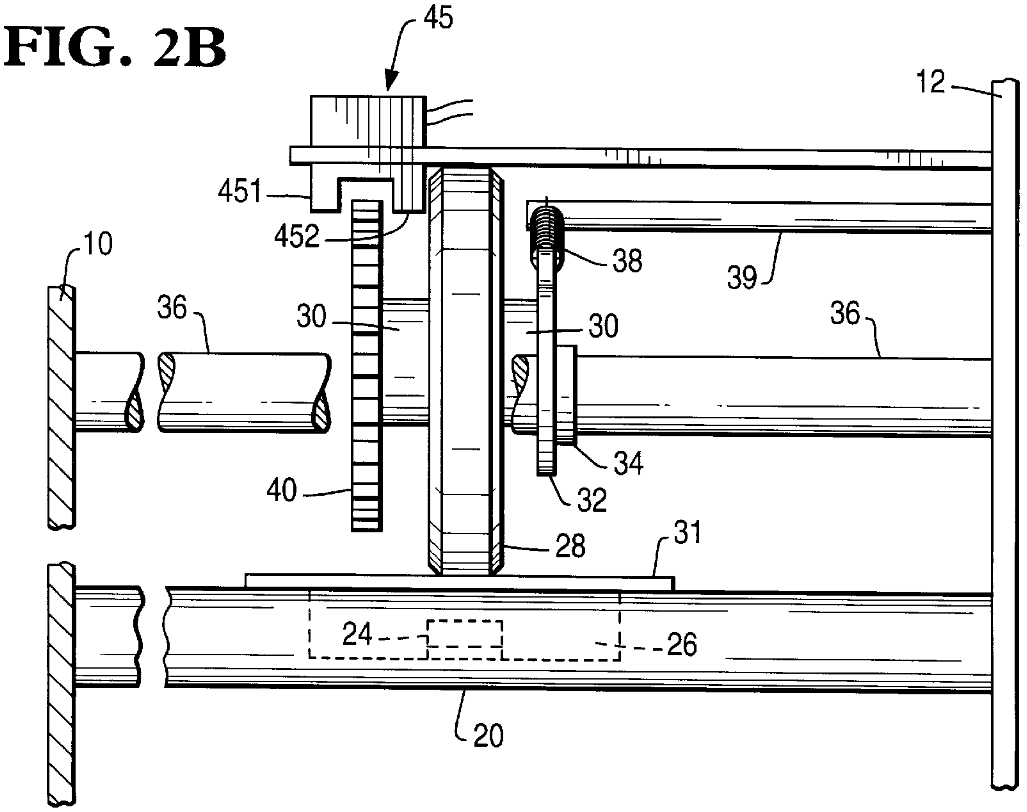
FIG. 2B is an end elevational view of the mechanism of FIG. 1B taken along the line 2—2 of FIG. 1B.

Positioned above the recess 26 in the guide means 20, as viewed in FIGS. 1 and 2, is a roller 28 which is of plastic construction. The roller 28 is not driven by the motor 29 (FIG. 3) which powers the drive rollers 16 in the transportation mechanism 14. Instead, the roller 28, which is rotatably mounted on a shaft 30, rotates under the influence of a record medium 31 transported along the feed path 22 so as to engage the roller 28, as illustrated in FIGS. 1B and 2B. The record medium 36 is a leading portion of a paper roll (not shown), the record medium 31 being driven by the feed rollers 16 in the direction of the arrow A towards a print head 52 (FIG. 3) for the printing of information thereon.

The shaft 30 is mounted on one end of an arm 32, the other end of which is secured to a bearing 34 which in turn rotates freely on a shaft 36 which is mounted between the frame members 10, 12. The arm 32 is urged to rotate in a counter-clockwise direction as viewed in FIG. 1 by a spring 38 which is connected at one end to the arm 32, and is connected at its other end to a stud 39 fixed in the frame member 12. Thus, in normal operation the roller 28 is urged by the spring 38 into engagement with the record medium 31, as illustrated in FIGS. 1B and 2B.

Also fixed on the shaft 30 to which the roller 28 is fixed is a circular timing disc 40 having a series of evenly spaced projections 42 and spaces 44 positioned around its circumference. If desired, other indicia, such as spaced markings on the disc 40, could be employed in place of the projections and spaces. The disc 40 is mounted on the shaft 30 such that rotation of the roller 28 will result in a corresponding rotation of the disc 40.

An optical sensor 45 is positioned in operative relation to the periphery of the disc 40 to sense the projections 42 and spaces 44 as the timing disc 40 rotates, when the roller 28 rotates by virtue of engagement with the record medium 31 as the record medium moves along the feed path 22, as illustrated in FIGS. 1B and 2B.

The sensor 45 includes a light emitting diode (LED) 451 and a sensor element 452 which are separated by a gap into which the periphery of a portion of the timing disc 40 is received when the roller 28 is urged away from the feed path 22, as discussed above.

Figure 3:
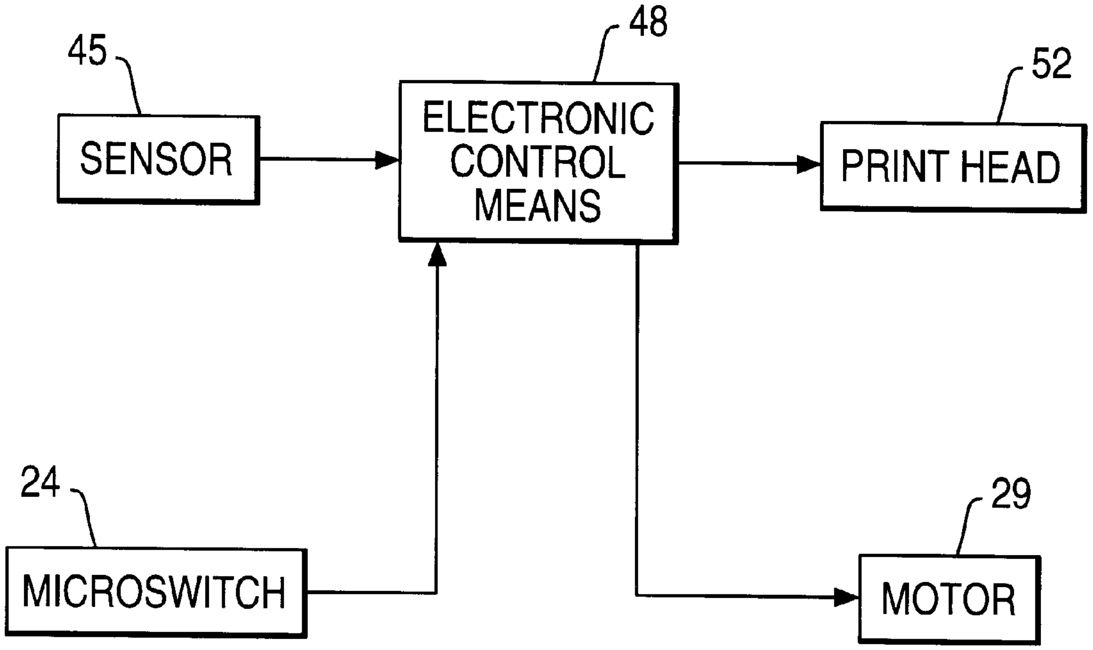
FIG. 3 is a block diagram of parts of an apparatus in accordance with the present invention coupled to a printer and a motor.

As shown in FIG. 3, the optical sensor 45 is coupled to electronic control means 48. The electronic control means 48 is arranged to count pulses generated by the sensor 45 in response to rotation of the disc 40.

The electronic control means 48 is arranged to measure periodically the time taken for the sensor element 452 to detect a predetermined number of pulses, say ten pulses, due to the passage of the record medium 31 along the feed path 22, and makes a determination as to whether the time taken lies within a predetermined range. This predetermined range corresponds to the range of speeds the printhead 52 can print legible text on the record medium 31. This range of speeds will be different for different printers. If the record medium 31 is traveling at a speed outside of this range the text printed on the medium 31 by the printhead 52 will be illegible. For as long as the control means 48 makes a determination that the above-mentioned time taken lies within said predetermined range, the control means 48 instructs the transportation mechanism 14 to continue to forward the medium 31 to the printhead 52 for printing. However, if the control means 48, makes a determination that the above-mentioned time taken lies outside said predetermined range, then the control means 48 will reactivate the printer. The printer will remain deactivated until the problem, which resulted in the medium 31 traveling at an unacceptable speed, has been solved. Further action taken at this time will depend on the type of apparatus in which the printer is embodied. For example, if the aforementioned components are part of an automated teller machine (ATM) then the ATM may display a message on its display to inform the user that the ATM is incapable of printing a receipt at this time. The ATM may also instigate recovery procedures or request repair by a field engineer, by informing the central control facility of the financial institution operating the ATM. These processes do not form part of the present invention and for this reason will not be described further here.

Operation of the apparatus described above is as follows. As a document or other record medium is passed through the media transportation mechanism 14, it will be driven between the roller 28 and the guide means 20. Movement of the record medium 31 along the feed path 22 under the influence of the feed wheels 16 causes the roller 28 to rotate and the associated timing disc 40 to rotate, resulting in pulses being detected by the sensor element 452. These pulses are transmitted to the electronic control means 48 wherein the time taken for a predetermined number of pulses, say ten, to be detected is measured. This time is then compared by the electronic control means 48 with a predetermined acceptable range of times, corresponding to record medium speeds which will result in legible text from the associated printerhead 52. As previously mentioned, appropriate action is taken by the electronic control means 48 depending on whether or not the time taken falls within the acceptable range.

The control means 48 may also take further action as described above.

The switch 24 also sends a continuous signal to the control means 48 when the switch 24 is opened. This ensures that the presence of the record medium 31 is detected even if the medium 31 becomes jammed in the feed path 22 with the timing disc 40 in a position such that one of the spaces 44 between the projections 42 lies between the LED 451 and the sensor element 452, such that the sensor 45 does not detect the presence of the record medium 31. If this situation occurs the control means can again actuate a recovery program or request external assistance, as discussed above.

If no record medium is present in the feed path 22, the roller 28 is urged by the spring 38 into engagement with the microswitch 24, thereby closing the microswitch 24 as seen in FIGS. 1A and 2A. The microswitch 24 is coupled to the electronic control means 48 whereby the electronic control means 48 is provided with a definite indication as to whether or not a record medium is present in the feed path 22.

In an alternative embodiment of the present invention, instead of measuring the time taken to detect a predetermined number of pulses, the data processor 46 may be arranged to count the number of pulses produced in a predetermined time, in order to make a determination of the speed of motion of the record medium 31.

What is claimed is:

1. An apparatus for detecting the presence of a record medium in a feed path and for sensing the speed of the record medium as it passes along the feed path, the apparatus comprising:

roller means moveable between a first position when the record medium is not present in the feed path and a second position when the record medium is passing along the feed path, the roller means being arranged to be rotated by virtue of management with the record medium when in the second position;

sensing means operative to provide an indication of the absence of the record medium when the roller means is in the first position;

pulse generating means for generating a series of pulses in response to rotation of the roller means; and electronic control means responsive to the pulses generated by the pulse generating means and for determining the speed of the record medium as it passes along the feed path.

2. An apparatus according to claim 1, wherein the control means is arranged to make a decision as to the speed of travel of the record medium based on the number of pulses detected in a predetermined time interval.

3. An apparatus according to claim 1, wherein the control means is arranged to make a decision as to the speed of travel of the record medium based on the time taken to detect a predetermined number of pulses.

4. An apparatus according to claim 1, wherein the sensing means includes a switch located relative to the roller means such that the switch is closed by the roller means when no record medium is present between the switch and the roller means, and open when the record medium supports the roller means away from the switch.

5. An apparatus according to claim 1, wherein the pulse generating means includes a timing disc coupled to the roller means, so as to rotate when the roller means rotates, and having a plurality of timing elements.

6. An apparatus according to claim 5, wherein the pulse generating means includes a light emitting diode (LED) and a sensor element arranged to sense the output of the LED, which is interrupted by the timing elements of the timing disc thus producing pulses, when a portion of the timing disc is present between the LED and the sensor element.

7. An apparatus according to claim 6, wherein the pulse generating means is mounted above the timing disc such that the timing elements are sensed when a record medium is present in the feed path so as to urge the roller means and the connected timing disc away from the feed path.

8. An apparatus according to claim 1, wherein the roller means is mounted on a shaft so as to restrain rotation of the roller means except that produced by the movement of the record medium along the feed path.

9. An apparatus according to claim 1, wherein the control means is arranged to determine whether the record medium is moving at a speed within a predetermined range of speeds, for which text printed by a printer used to print information on the record medium will be legible, and produces a signal representative of this determination.

10. An apparatus for detecting the presence of a record medium in a feed path and for sensing the speed of the record medium as it passes along the feed path, the apparatus comprising:

a roller moveable between a first position when the record medium is not present in the feed path and a second position when the record medium is passing along the feed path, the roller being arranged to be rotated by virtue of management with the record medium when in the second position;

a sensing unit operative to provide an indication of the absence of the record medium when the roller is in the first position;

a pulse generating unit for generating a series of pulses in response to rotation of the roller; and an electronic control unit responsive to the pulses generated by the pulse generating unit and for determining the speed of the record medium as it passes along the feed path.

11. An apparatus according to claim 10, wherein the control unit is arranged to make a decision as to the speed of travel of the record medium based on the number of pulses detected in a predetermined time interval.

12. An apparatus according to claim 10, wherein the control unit is arranged to make a decision as to the speed of travel of the record medium based on the time taken to detect a predetermined number of pulses.

13. An apparatus according to claim 10, wherein the sensing unit includes a switch located relative to the roller such that the switch is closed by the roller when no record medium is present between the switch and the roller, and open when the record medium supports the roller away from the switch.

14. An apparatus according to claim 10, wherein the pulse generating unit includes a timing disc coupled to the roller, so as to rotate when the roller rotates, and having a plurality of timing elements.

15. An apparatus according to claim 14, wherein the pulse generating unit includes a light emitting diode (LED) and a sensor element arranged to sense the output of the LED, which is interrupted by the timing elements of the timing disc thus producing pulses, when a portion of the timing disc is present between the LED and the sensor element.

16. An apparatus according to claim 15, wherein the pulse generating unit is mounted above the timing disc such that the timing elements are sensed when a record medium is present in the feed path so as to urge the roller means and the connected timing disc away from the feed path.

17. An apparatus according to claim 10, wherein the roller is mounted on a shaft so as to restrain rotation of the roller except that produced by the movement of the record medium along the feed path.

18. An apparatus according to claim 10, wherein the control unit is arranged to determine whether the record medium is moving at a speed within a predetermined range of speeds, for which text printed by a printer used to print information on the record medium will be legible, and produces a signal representative of this determination.

* * * * *

UNITED STATES PATENT AND TRADEMARK OFFICE

CERTIFICATE OF CORRECTION

PATENT NO. : 5,900,639

DATED : May 4, 1999

INVENTOR(S) : Kenneth J. Peters

It is certified that error appears in the above-indentified patent and that said Letters Patent is hereby corrected as shown below:

Column 4, line 28, "management" should be --engagement--.

Column 5, line 19, "management" should be --engagement--.

Signed and Sealed this

Eighth Day of February, 2000

Attest:

Q. TODD DICKINSON

*Attesting Officer*

*Commissioner of Patents and Trademarks*